No. 717,032. Patented Dec. 30, 1902.
H. C. SCHLICHTER.
WATER FILTERING OR CLEANING PLANT.
(Application filed Aug. 23, 1901.)
(No Model.)

Witnesses.
Hans Brenner.
Willi Kasper.

Inventor:
Heinrich Christian Schlichter
per Gerson Sachse
Attorneys.

UNITED STATES PATENT OFFICE.

HEINRICH CHRISTIAN SCHLICHTER, OF SINGEN, GERMANY.

WATER FILTERING OR CLEANING PLANT.

SPECIFICATION forming part of Letters Patent No. 717,032, dated December 30, 1902.

Application filed August 23, 1901. Serial No. 73,082. (No model.)

*To all whom it may concern:*

Be it known that I, HEINRICH CHRISTIAN SCHLICHTER, a subject of the Emperor of Germany, residing at Singen-on-the-Bodensee, German Empire, have invented a new and useful Water Filtering or Cleaning Plant, of which the following is a specification.

The invention consists of a water filtering or cleaning plant adaptable to any capacity and permitting a constant and rapid flow of water therethrough. Further, it possesses the advantage of seldom requiring cleansing, inasmuch as the impurities are themselves continually utilized for further filtering.

Figure 1:
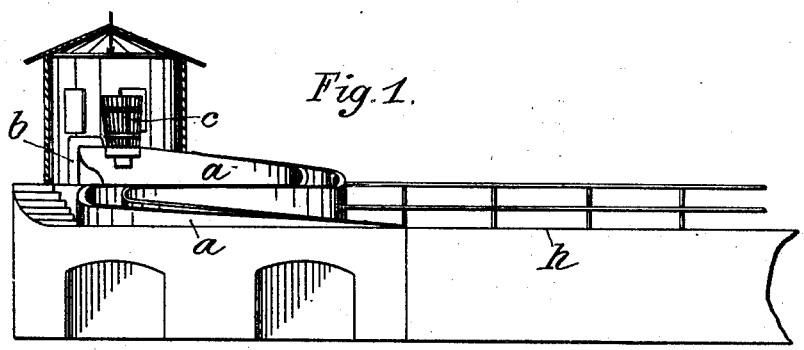
Figure 2:
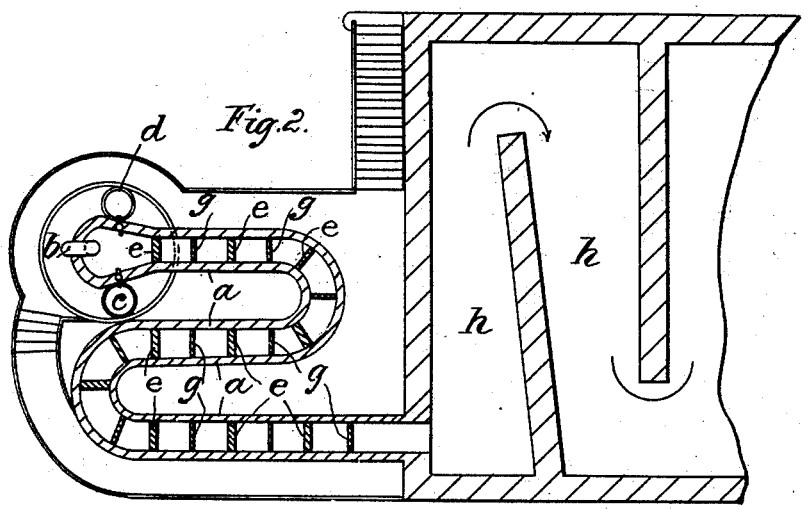
Figure 3:
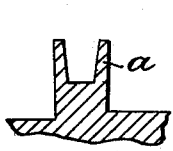
Figure 4:
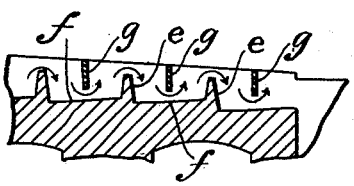

In the accompanying drawings, in which similar letters of reference refer throughout to similar parts, Figure 1 shows in elevation a water-filtering plant embodying the present invention. Fig. 2 is a plan view of Fig. 1. Figs. 3 and 4 illustrate in cross and longitudinal sections, respectively, the water-race employed.

In the construction of such a plant as is embraced in the present invention, $a$ represents the race or channel, which is fed with water from pipe $b$, suitably elevated and supplied with some cleansing material, as chalk and soda, in tanks $c$ $d$. The channel-way $a$ is arranged in S form, as shown, spiral, or any desired way. It is given a desired inclination, preferably steep, so as to cause a rapid flow of water. The floor of this channel is formed in steps, each slanting downwardly toward the rear—that is, toward the rise of the next above-lying step. Dams $e$ $e$ are built in the channel and at the front edge of each step, so as to cause a fall in the water. Between each of the dams cross-shields $g$ $g$ are mounted, so as to give the water a downward sweep. The channel opens into a reservoir or receiving-basin $h$ $h$, which is in turn provided with partially transverse extending walls for the purpose of causing the current to cover more ground than is usual in such like plants.

It will be seen that as the water flows down through the channel or race and over the different dams onto the successive lower steps the fall, in conjunction with the backward downward inclination of each step, produces a strong eddy and checks the motion of the water, so as to settle the water in a most thorough manner. The constant accumulations of precipitated impurities, which act as a purifying material, as is well known, here constantly increases the efficiency of the plant, while the peculiar inclination of the steps, together with the shields, form such an eddy that the water can be rushed through at a rapid rate, quite in reverse to hitherto-employed filtering plants. It is also obvious that the channel may be spirally constructed in a water-tower, while the system is equally well applicable on a small scale for private use.

Having now described my invention, what I claim as new, and desire to protect by Letters Patent, is—

1. In a water-purifying plant, the combination of an inclined water-channel, consisting of a series of descending steps having backwardly-inclined floors, upright partitions separating the successive steps, and over which the water flows, and intermediate partitions over each step, separated by an open space from said floors, and beneath which the water flows, so as to cause a downward circular motion of the water-current in coöperating with said floors, whereby the impurities are separated by centrifugal force, and caused to lodge in the corners of the channel.

2. In a water-purifying plant, the combination of an inclined water-channel, consisting of a series of descending steps having backwardly-inclined floors, upright partitions separating the successive steps, and over which the water flows, and intermediate partitions over each step beneath which the water flows, so as to cause a downward circular motion of the water-current in coöperating with said floors, the chambers formed by said upright partitions being free of filtering material.

3. In a water-purifying plant, the combination of an inclined water-channel, consisting of a series of descending steps having backwardly-inclined floors, upright partitions separating the successive steps, and over which the water flows, and intermediate partitions over each step, separated by an open space from said floors, and beneath which the water flows so as to cause a downward circular motion of the water-current in
5 coöperating with said floors, whereby the impurities are separated by centrifugal force, and caused to lodge in the corners of the channel, the chambers formed by said upright partitions being free of filtering material, substantially as described.

HEINRICH CHRISTIAN SCHLICHTER.

Witnesses:
JULIUS BRENZINGER,
OTTO WILLNER.